(12) United States Patent
Jeong et al.

(10) Patent No.: US 7,043,987 B2
(45) Date of Patent: May 16, 2006

(54) ROTARY GYROSCOPE

(75) Inventors: Hee-moon Jeong, Yong-si (KR);
In-seob Song, Sungnam-si (KR);
Seok-jin Kang, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 92 days.

(21) Appl. No.: 10/793,331

(22) Filed: Mar. 5, 2004

(65) Prior Publication Data

US 2004/0231418 A1    Nov. 25, 2004

(30) Foreign Application Priority Data

Mar. 6, 2003    (KR) ...................... 10-2003-0014106

(51) Int. Cl.
*G01P 9/04* (2006.01)
(52) U.S. Cl. .................................. 73/504.12
(58) Field of Classification Search ............ 74/504.12, 74/504.13, 504.08, 504.11
See application file for complete search history.

(56) References Cited

U.S. PATENT DOCUMENTS

| 5,955,668 | A | 9/1999 | Hsu et al. ................ 73/504.12 |
| 6,067,858 | A | 5/2000 | Clark et al. .............. 73/504.16 |
| 6,122,961 | A | 9/2000 | Geen et al. ............... 73/504.12 |
| 6,240,780 | B1 | 6/2001 | Negoro et al. ........... 73/504.12 |
| 6,374,672 | B1 | 4/2002 | Abbink et al. ........... 73/504.12 |
| 6,443,008 | B1 | 9/2002 | Funk et al. ............... 73/504.12 |
| 6,918,298 | B1 * | 7/2005 | Park ........................ 73/504.16 |
| 2002/0020219 | A1 | 2/2002 | DeRoo et al. |
| 2004/0011130 | A1 | 1/2004 | Bauer et al. |

FOREIGN PATENT DOCUMENTS

| JP | 11-325905 | 11/1999 |
| KR | 2000-0050760 | 8/2000 |
| KR | 2001-0005461 | 1/2001 |
| WO | 01/20259 | 3/2001 |
| WO | WO 01/79862 A1 | 10/2001 |
| WO | WO 02/14787 A1 | 2/2002 |

* cited by examiner

*Primary Examiner*—John E. Chapman
(74) *Attorney, Agent, or Firm*—Lee & Morse, P.C.

(57) ABSTRACT

A rotary gyroscope includes a base plate, an intermediate structure, including a driven element floating over the base plate and supported by a driving supporter radially extending therefrom, the driven element performing an oscillating motion with respect to a first axis, which is normal to a center plane thereof, a driving electrode driving the driven element, and a sensing element disposed in the driven element and connected to the driven element by a sensing connector to oscillate together with the driven element and concurrently to perform a sensing motion with respect to a third axis, which is normal to the first axis and any second axis, which is parallel to a center plane, due to a Coriolis force when an angular velocity is inputted from the second axis, and a cover covering the intermediate structure and having a sensing electrode to detect the sensing motion of the sensing element.

22 Claims, 8 Drawing Sheets

ROTARY GYROSCOPE

BACKGROUND OF THE INVENTION

1. Field of the Invention

The present invention relates to a gyroscope for sensing an angular velocity using a rotational resonance motion of a mass moving in a regular angle. More particularly, the present invention relates to a rotary gyroscope capable of sensing a plurality of angular velocities corresponding to a plurality of axes in a plane.

2. Description of the Related Art

Generally, a gyroscope detects a rotational angular velocity by changing a displacement of a mass due to a Coriolis force into a change in capacitance, based on a principle that when a mass oscillating or rotating in a direction of a first axis is applied with a force of rotating in a constant angular velocity from a direction of a second axis, which is normal to the first axis, the Coriolis force acts on the mass in a direction of a third axis, which is normal to both the first axis direction and the second axis direction.

Such a gyroscope is currently in use as a core part for precision navigation in ships and airplanes. Recently, developments in micro-electromechanical system (MEMS) technology have enabled the application of a gyroscope in a navigation device of automobiles and as a hand-oscillation compensating device of high performance video cameras.

Although there are conventional micro-gyroscopes that can measure an input angular velocity normal to a center plane thereof, which may be easily fabricated and driven, these conventional micro-gyroscopes have a disadvantage in that they are not able to detect angular velocities of more than two axes in a plane.

More specifically, if the micro-gyroscopes were to be used in sensing angular velocities of a plurality of axes, elements such as a sensing mass and a driven mass should be vertically disposed. Such a configuration requires an additional assembling process for vertically disposing the elements and a size of the micro-gyroscope is increased.

In an effort to solve these problems, other conventional micro-gyroscopes have been proposed that are capable of sensing angular velocities of a plurality axes in a plane. These other conventional micro-gyroscopes, however, present several varying problems. For example, these conventional micro-gyroscopes may experience problems with one or more of the following: difficulties in adjusting a driving and sensing frequencies due to a coupling of a driven unit including a driven mass and a motion of sensing unit including a sensing mass, adhesion between the sensing mass or sending unit and a sensing electrode, deterioration of performance due to a weak levitation force, decreased sensing motion, deformation of a sensing mode, or a relatively complicated fabrication processes.

SUMMARY OF THE INVENTION

Therefore, in an effort to solve at least some of the above-mentioned problems, it is a feature of an embodiment of the present invention to provide a rotary gyroscope that is capable of sensing angular velocities of a plurality of axes in a plane, in which a motion of a driven unit or element is decoupled and a motion of sensing unit or element is coupled, so that a Coriolis force is able to additionally act on the sensing element to enhance sensing performance, and in which the driven element is disposed around the sensing element to provide a structure resistant to deformation of a sensing mode.

It is another feature of an embodiment of the present invention to provide a rotary gyroscope having a circular sensing electrode to solve a coupling problem in which a motion of the driven element affects a motion of the sensing element.

It is still another feature of an embodiment of the present invention to provide a rotary gyroscope having a sensing electrode formed in a cover to solve a problem that a sensing element and a sensing electrode have to be fabricated apart from each other and a problem that the sensing element and the sensing electrode adhere to each other.

In order to provide the above and other features of the present invention, a rotary gyroscope includes a base plate, an intermediate structure, including a driven element supported in a spaced-apart relation from the base plate and floating over the base plate and supported by a driving supporter radially extending therefrom, the driven element performing an oscillating motion with respect to a first axis, which is normal to a center plane thereof, a driving electrode driving the driven element to perform the oscillating motion with respect to the first axis, and a sensing element disposed in the driven element and connected to the driven element by a sensing connector to oscillate together with the driven element and concurrently to perform a sensing motion with respect to a third axis, which is normal to the first axis and any second axis, which is parallel to a center plane, due to a Coriolis force when an angular velocity is inputted from the second axis, and a cover covering the intermediate structure and having a sensing electrode arranged in a position corresponding to the sensing element in a spaced-apart relation therewith to detect the sensing motion of the sensing element.

In a preferred embodiment of the present invention, the driven element includes a circular rim frame disposed in a spaced-apart relation with the base plate to float over the base plate and a plurality of driven arm parts extending radially from around the circular rim frame. Each of the plurality of driven arm parts may include a plurality of driven arms and a plurality of movable driven comb portions, each having a plurality of movable driven combs formed alternately in two different directions at a circumference in a unit of the driven arm part at one of either side surface of the driven arms of the corresponding driven arm part.

The driving electrode may include a driving electrode pad part disposed around the driven element and a plurality of fixed driving comb portions formed in a circumferential direction at the driving electrode pad part to be arranged opposite to the corresponding movable driven comb portions in a spaced-apart relation therewith.

It is preferable that the driving electrode pad part includes four driving electrode pads arranged in intervals of a predetermined angle from one another to divide a circumference of the driven element, and wherein the plurality of fixed driving comb portions includes four fixed driving comb portions, each having a plurality of fixed driving combs formed alternately in two different directions at a circumference in a unit of driving electrode pad at the respective driving electrode pads to be arranged opposite to the movable driven combs of the corresponding movable driven comb portion in a spaced-apart relation therewith.

The intermediate structure may further include a drive sensing part controlling the oscillating motion of the driven element. The drive sensing part may include a drive sensing electrode pad part arranged around the driven element, a plurality of movable drive sensing comb portions formed on supporting arms of the driving supporter and at least one sensing arm arranged with respect to the drive sensing electrode pad part around the driven element, and a plurality of fixed drive sensing comb portions formed on the drive sensing electrode pad part to be arranged opposite to respective movable drive sensing comb portions in a spaced-apart relation therewith.

It is preferable that the drive sensing electrode pad part includes two drive sensing electrode pads arranged in intervals of a predetermined angle from each other to divide a circumference of the driven element and arranged between the four driving electrode pads arranged in intervals of a predetermined angle from one another to divide the circumference of the driven element, and wherein the plurality of fixed drive sensing comb portions includes two fixed driving comb portions, each having a plurality of fixed driving combs formed in a same direction at a circumference on the corresponding drive sensing electrode pad.

In addition, the intermediate structure may further include a periphery supporting member combined with the cover and enclosing the driven element, the driving electrode, and the driving supporter.

The periphery supporting member, the base plate, the intermediate structure, and the cover may each have a rectangular-shaped configuration.

The driving supporter may include a plurality of supporting arms extended radially from around the driven element and a plurality of driving springs interconnecting between the plurality of supporting arms and one of the periphery supporting member and fixed supporting ends supported at the base plate to allow the driven element to perform the oscillating motion with respect to the first axis. In this case, the driving supporter preferably includes four driving supporters disposed in a vicinity of a diagonal corner of the periphery supporting member.

The sensing element may include a circular disk having a circular hole formed at a center thereof. The intermediate structure may further include a fixing portion disposed in the circular hole in a spaced-apart relation therewith to interconnect the base plate and the cover.

The sensing connector may include two sensing springs connecting the sensing element and the driven element. Each of the sensing springs may have a configuration selected from the group consisting of a beam having a predetermined length and a rectangular cross section, and a beam structure in which more than two beams, each having a predetermined length and a rectangular cross section, are connected by at least one connecting member.

The sensing electrode may include two fixed sensing electrode parts formed respectively in a semi-circular shape at a portion of the cover opposite to the sensing element to be divided among the two with respect to an axis on which the sensing springs are disposed.

Each of the fixed sensing electrode parts may include an electrode wire having a predetermined width, disposed along an inner surface of the cover to be connected with a corresponding fixed sensing electrode pad disposed at the intermediate structure.

The cover may include a plurality of holes penetrating the cover formed at positions of the cover corresponding to driving electrode pads, drive sensing electrode pads, and fixed sensing electrode pads to allow wires to be connected thereto from outside, the driving electrode pads constituting the driving electrode, the drive sensing electrode pads being disposed at the intermediate structure to constitute the drive sensing part, and the fixed sensing electrode pads being disposed at the intermediate structure to be connected with the sensing electrode.

The rotary gyroscope may further include an insulator disposed between the base plate and the intermediate structure, to float the sensing element and the driven element over the base plate in a spaced-apart relation therewith and at the same time to support and insulate fixed supporting ends for supporting at least the driving electrode, the periphery supporting member and the driving supporter on and from the base plate.

Preferably, the base plate, the insulator, and the intermediate structure are each formed of a SOI wafer, and the cover is formed of a glass wafer.

In the rotary gyroscope, the driven element, the driven arm part, the driving supporter, and the sensing element each include a plurality of holes formed in a predetermined pattern to reduce weight thereof, thereby facilitating the motion thereof and an etching of an insulator.

Alternately, the base plate and the insulator may be formed of a glass wafer, the intermediate structure may be formed of a silicon wafer, and the cover may be a glass wafer.

BRIEF DESCRIPTION OF THE DRAWINGS

The above and other features and advantages of the present invention will become more apparent to those of ordinary skill in the art by describing in detail a preferred embodiment thereof with reference to the attached drawings in which.

DETAILED DESCRIPTION OF THE INVENTION

Korean Patent Application No. 2003-14106, filed on Mar. 6, 2003, and entitled: "Rotary Gyroscope," is incorporated by reference herein in its entirety.

The present invention will now be described more fully hereinafter with reference to the accompanying drawings, in which a preferred embodiment of the invention is shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
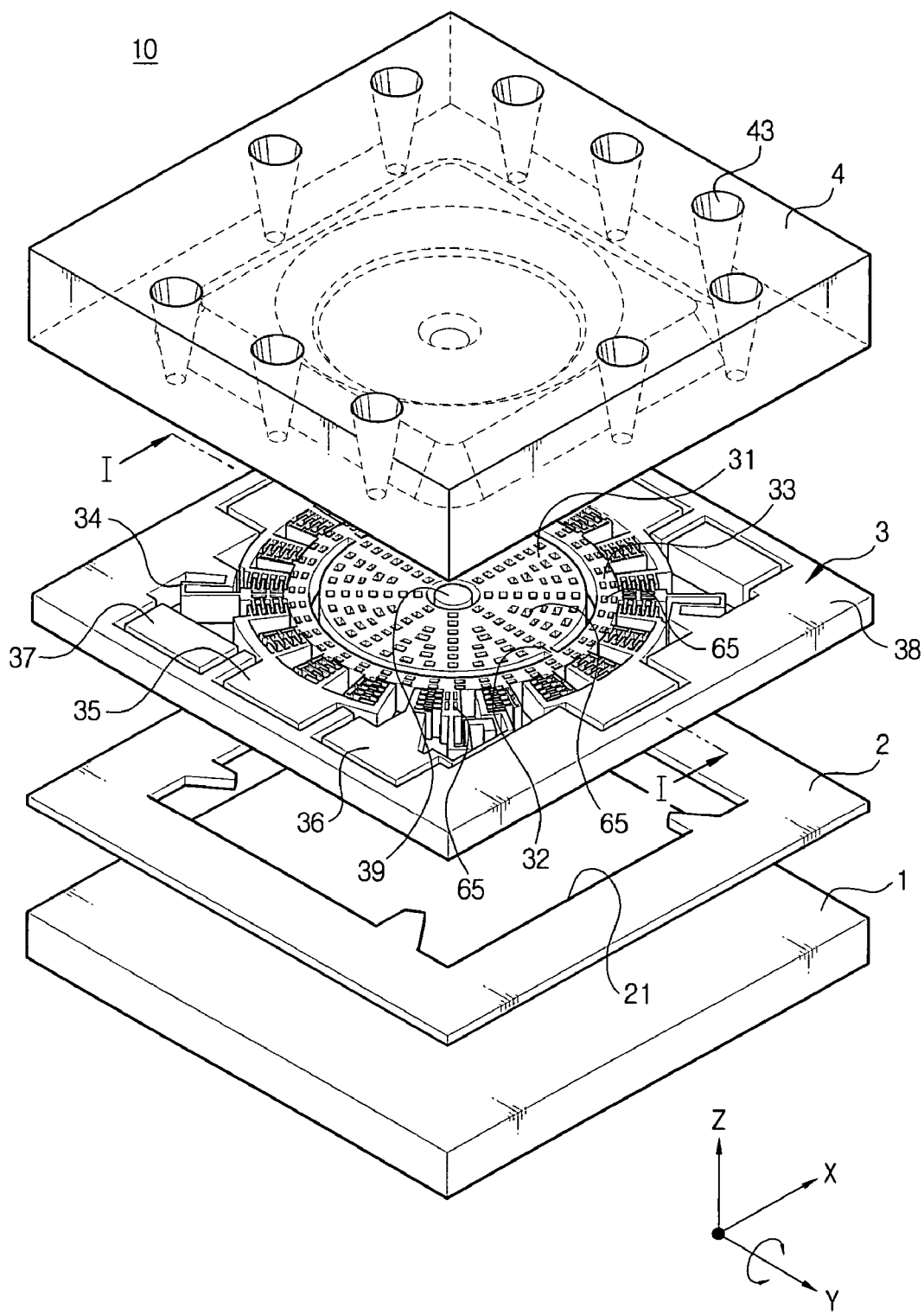
FIGS. 1A and 1B illustrate an exploded perspective view and a partially cutaway perspective view of a rotary gyroscope in accordance with a preferred embodiment of the present invention.
Figure 1B:
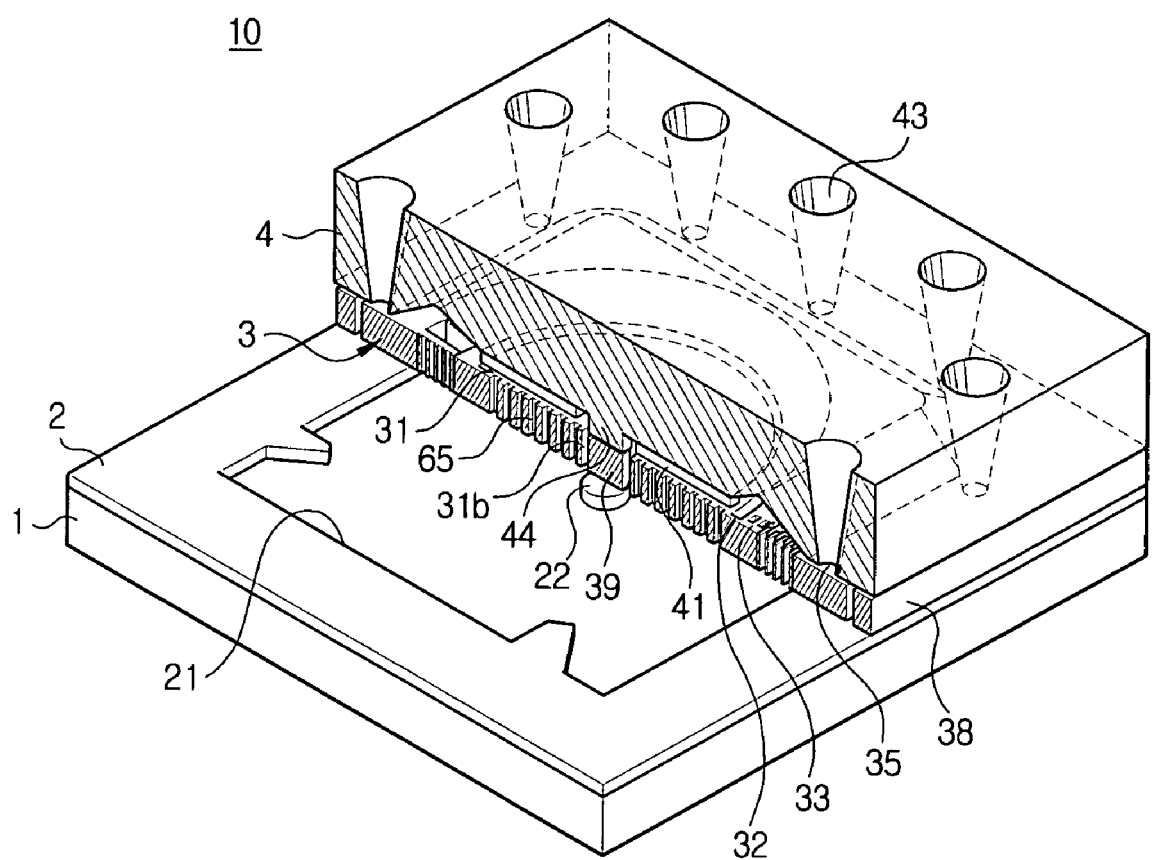

FIGS. 1A and 1B illustrate an exploded perspective view and a partially cutaway perspective view of a rotary gyroscope 10 in accordance with a preferred embodiment of the present invention.

Referring to FIGS. 1A and 1B, the rotary gyroscope 10 includes a base plate 1, an insulator 2 disposed on the base plate 1, an intermediate structure 3, and a cover 4.

Figure 5:
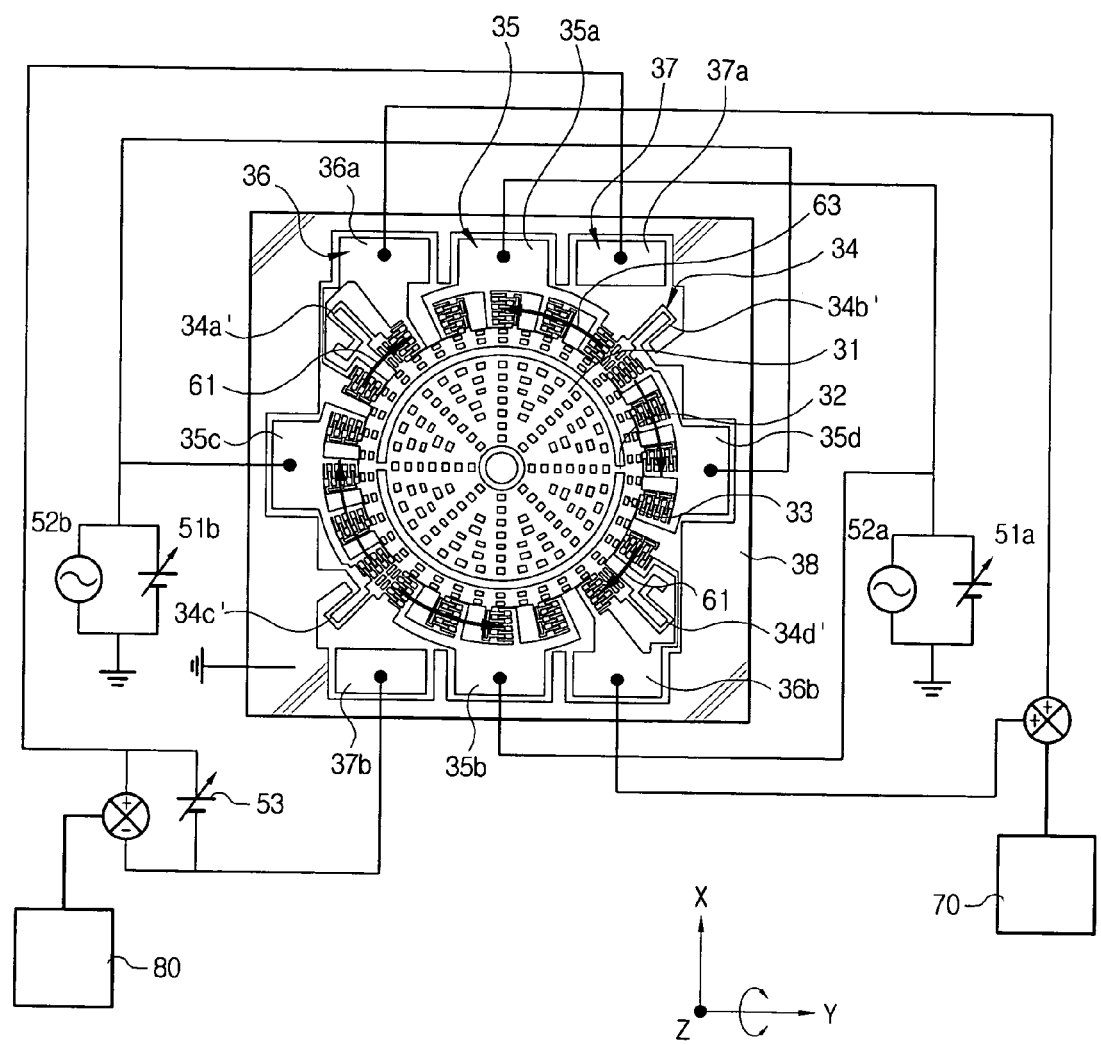
FIG. 5 is a circuit diagram illustrating electrical connections of the intermediate structure of the rotary gyroscope shown in FIGS. 1A and 1B.
Figure 6A:
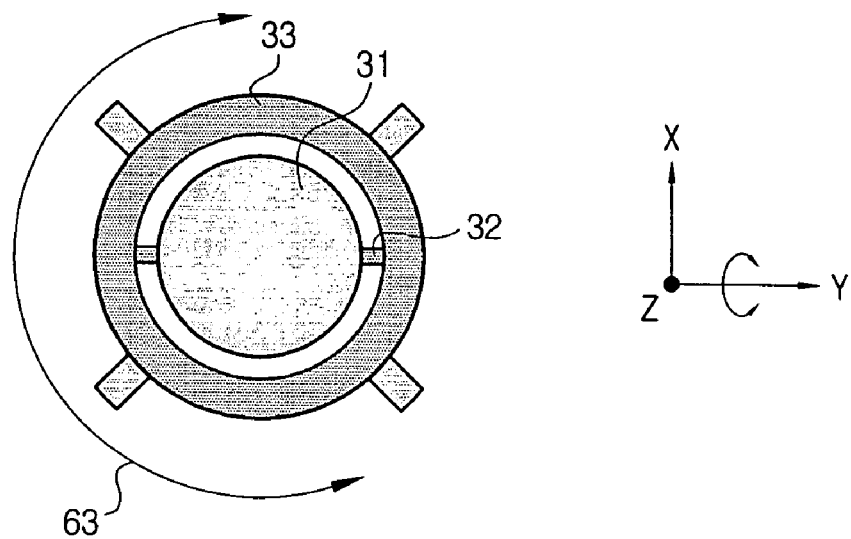
FIGS. 6A and 6B illustrate top plan views for showing an oscillating motion of a driven element and a sensing motion of a sensing element, respectively, of the intermediate structure shown in FIGS. 2A and 2B.
Figure 6B:
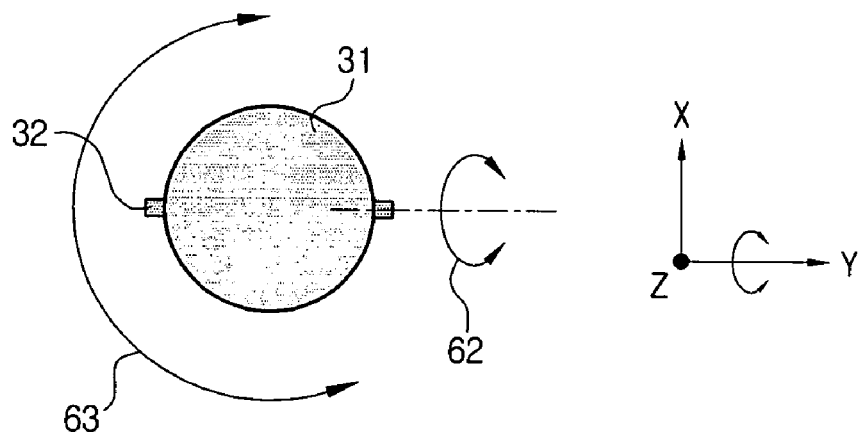

The intermediate structure 3 includes a driven element 33, which is supported in a spaced-apart relation from the base plate 1 by the insulator 2 and which floats over the base plate 1 and is supported by a driving supporter 34 radially extended therefrom. The driven element performs an oscillating motion 63, as shown in FIGS. 5 and 6A, by rotating with respect to a Z-axis normal to a center plane thereof. The intermediate structure additionally includes a driving electrode 35 driving the driven element 33 to perform the oscillating motion with respect to the Z-axis and a sensing element 31 arranged in the driven element 33. The sensing element 31 has two ends and both of these ends are connected to the driven element 33 through a sensing connector 32 so that the sensing element 31 and the driven element 33 oscillate together. Concurrently, the sensing element 31 performs a sensing motion 62, as shown in FIG. 6B, due to a Coriolis force with respect to an Y-axis, which is normal to the Z-axis, and another axis, for example, an X-axis, which is parallel to the center plane, when an angular velocity (61 of FIG. 5) is inputted from the X-axis direction.

The cover 4 covers the intermediate structure 3 and includes a sensing electrode (41 of FIG. 4) arranged in a position corresponding to the sensing element 31 in a spaced-apart relation therefrom to sense the sensing motion of the sensing element 31.

The base plate 1, the insulator 2, the intermediate structure 3, and the cover 4 each have a rectangular-shaped configuration.

The insulator 2 has a rectangular-shaped inner receiving opening 21 to permit the driven element 33, which performs the oscillating motion, and the sensing element 31, which performs the sensing motion, to be floated therein.

Figure 2A:
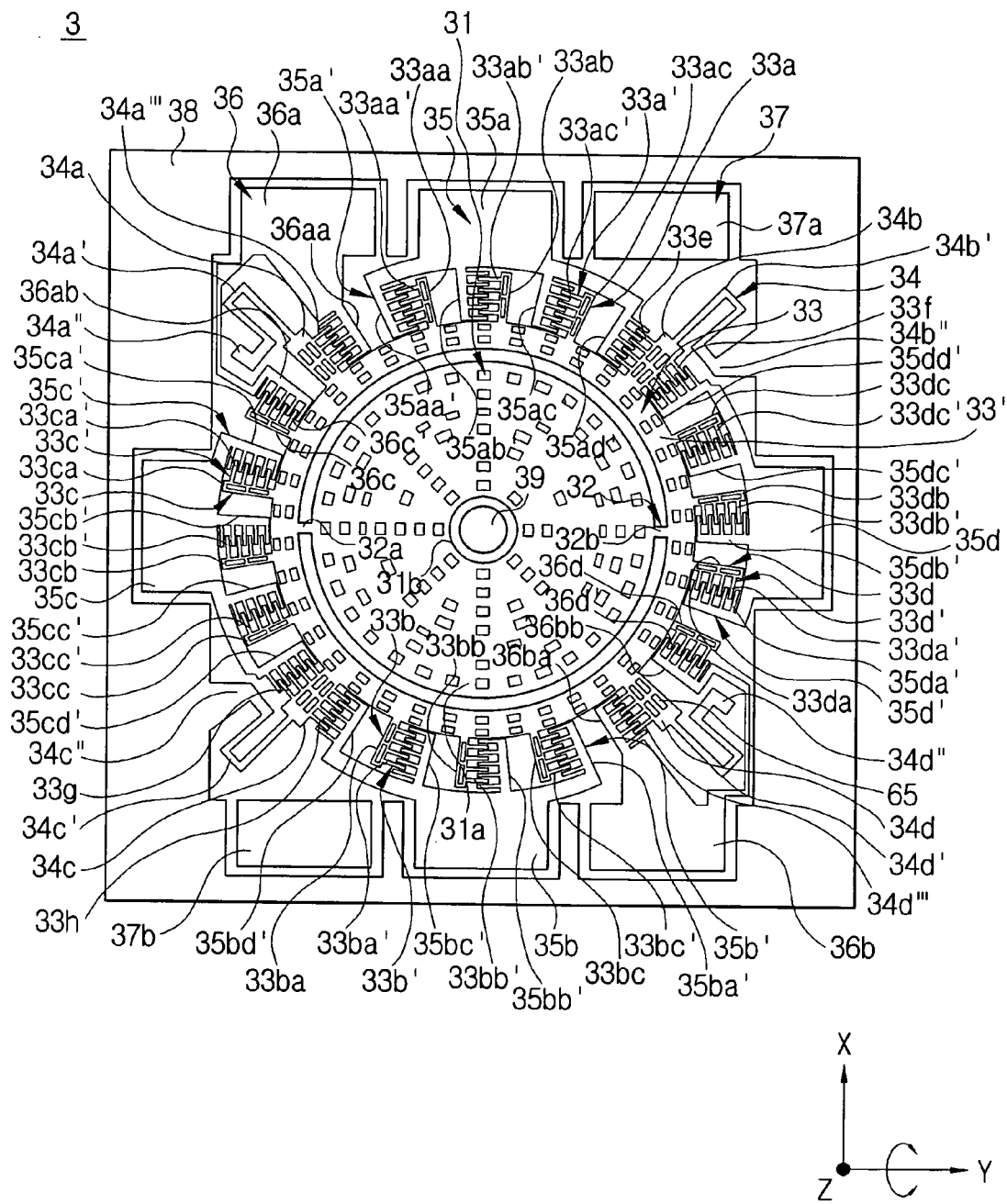
FIGS. 2A and 2B illustrate a top plan view and a perspective view of an intermediate structure of the rotary gyroscope shown in FIGS. 1A and 1B.
Figure 2B:
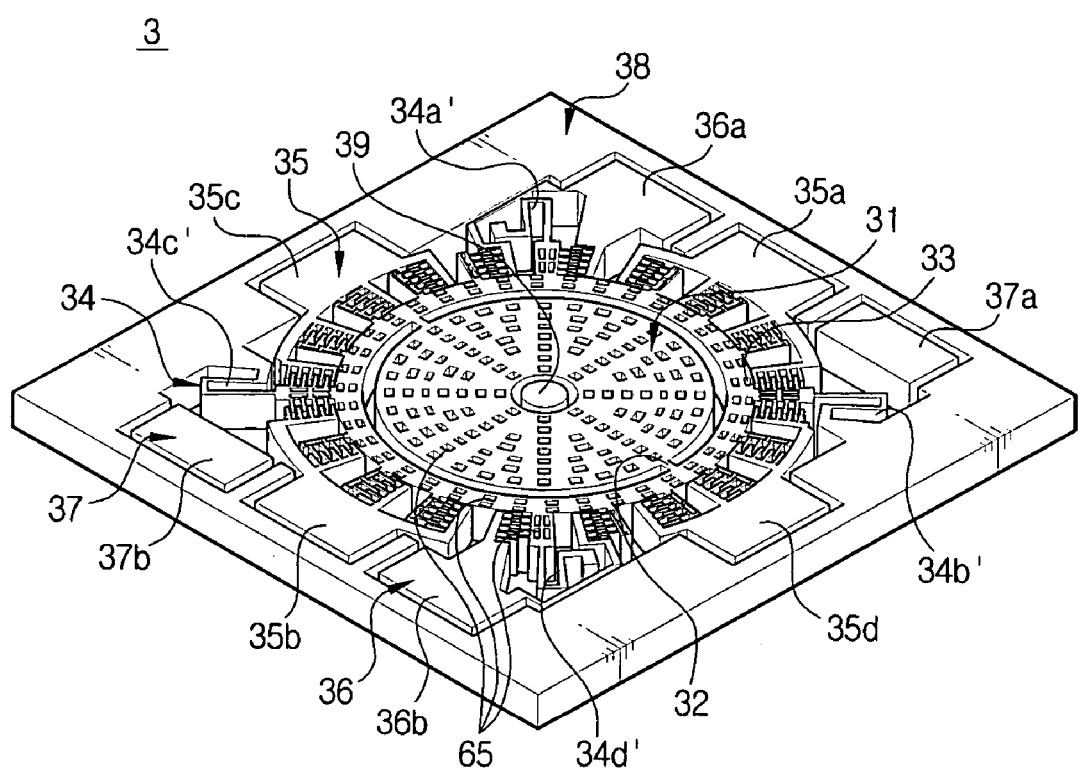

Additionally referring to FIGS. 2A and 2B, the inner receiving opening 21 is formed correspondingly to a region of the intermediate structure 3 in which movable component parts are positioned. The movable component parts of the intermediate structure 3 include a circular rim frame 33'; a first driven arm part 33a, a second driven arm part 33b, a third driven arm part 33c, and a fourth driven arm part 33d; a first supporting arm 34a, a second supporting arm 34b, a third supporting arm 34c, and a fourth supporting arm 34d; a first sensing arm 36c and a second sensing arm 36d; and a circular disk 31a of the sensing element 31. The movable component parts will be described in greater detail below.

The intermediate structure 3 additionally includes fixed component parts. The fixed component parts of the intermediate structure 3 are physically supported and electrically insulated by the insulator 2. The fixed component parts of the intermediate structure 3 include a periphery supporting member 38; a first driving electrode pad 35a, a second driving electrode pad 35b, a third driving electrode pad 35c, and a fourth driving electrode pad 35d; a first drive sensing electrode pad 36a and a second drive sensing electrode pad 36b; a fixed sensing electrode pad part 37 including a first fixed sensing electrode pad 37a and a second fixed sensing electrode pad 37b; and a first fixed supporting end 34a'', a second fixed supporting end 34b'', a third fixed supporting end 34c'', and a fourth fixed supporting end 34d''. The fixed component parts will be described in greater detail below.

As shown in FIGS. 2A and 2B, the driven element 33 of the intermediate structure 3 is provided with a circular rim frame 33' floating over the base plate 1 in a spaced-apart relation from the base plate 1. A first driven arm part 33a, a second driven arm part 33b, a third driven arm part 33c, and a fourth driven arm part 33d extended radially from around the circular rim frame 33' in intervals of predetermined angles, for example, 90°.

The first driven arm part 33a includes a first driven arm 33aa, a second driven arm 33ab, and a third driven arm 33ac. The second driven arm part 33b includes a first driven arm 33ba, a second driven arm 33bb, and a third driven arm 33bc. The third driven arm part 33c includes a first driven arm 33ca, a second driven arm 33cb, and a third driven arm 33cc. The fourth driven arm part 33d includes a first driven arm 33da, a second driven arm 33db, and a third driven arm 33dc.

In addition, the first, second, third and fourth driven arm parts 33a, 33b, 33c, 33d, respectively, have a first movable driven comb portion 33a', a second movable driven comb portion 33b', a third movable driven comb portion 33c', and a fourth movable driven comb portion 33d', respectively. Each of the first, second, third, and fourth movable driven comb portions 33a', 33b', 33c', and 33d', respectively, has three movable driven combs. The first movable driven comb portion 33a' has movable driven combs 33aa', 33ab', 33ac'. The second movable driven comb portion 33b' has movable driven combs 33ba', 33bb', 33bc'. The third movable driven comb portion 33c' has movable driven combs 33ca', 33cb', 33cc'. The fourth movable driven comb portion 33d' has movable driven combs 33da', 33db', 33dc'. The movable driven comb portions are formed alternately in two different directions at a circumference in a unit of the driven arm part on one of either side surface of the corresponding first, second, and third driven arms 33aa, 33ab, 33ac; 33ba, 33bb, 33bc; 33ca, 33cb, 33cc; or 33da, 33db, 33dc of the corresponding driven arm part 33a, 33b, 33c, or 33d.

The first, second, third and fourth supporting arms 34a, 34b, 34c, 34d of the driving supporter 34 are formed around the circular rim frame 33'. A fifth, a sixth, a seventh and an eighth movable driven comb portions 33e, 33f, 33g; 33h are formed on both surfaces of the second and the third supporting arms 34b and 34c among the first, second, third and fourth supporting arms 34a, 34b, 34c, 34d.

The driving electrode 35 is provided with a first driving electrode pad 35a, a second driving electrode pad 35b, a third driving electrode pad 35c, and a fourth driving electrode pad 35d, which are arranged in intervals of predetermined angles, for example 90° from one another, to divide a circumference of the circular rim frame 33' of the driven element 33. The driving electrode 35 is additionally provided with a first fixed driving comb portion 35a', a second fixed driving comb portion 35b', a third fixed driving comb portion 35c', and a fourth fixed driving comb portion 35d' formed respectively on the first, second, third and fourth driving electrode pads 35a, 35b, 35c and 35d, respectively, to be arranged opposite to the first, second, third and fourth movable driven comb portions 33a', 33b', 33c', 33d', respectively, in a spaced-apart relation therewith.

As shown in FIG. 5, the first and second driving electrode pads 35a, 35b are connected to a first driving DC power source 51a and a first driving AC power source 52a through wires connected through holes (43 of FIG. 4) penetrating the cover 4. The third and the fourth driving electrode pads 35c, 35d are connected to a second driving DC power source 51b and a second driving AC power source 52b.

The first and the second DC power sources 51a, 51b and the first and second AC power sources 52a, 52b are disposed in a manner known in the art at a substrate (not shown) on which a drive control circuit 70 is installed, and are controlled by the drive control circuit 70.

Referring again to FIGS. 2A and 2B, each of the first, second, third and fourth fixed driving comb portions 35a', 35b', 35c', 35d', respectively, is composed of four combs 35aa', 35ab', 35ac', 35ad'; 35ba', 35bb', 35bc', 35bd'; 35ca', 35cb', 35cc', 35cd'; or 35da', 35db', 35dc', 35dd' ∝opposite to the three movable driven combs 33aa', 33ab', 33ac'; 33ba', 33bb', 33bc'; 33ca', 33cb', 33cc'; or 33da', 33db', 33dc' of the corr movable driven comb portions 33a', 33b', 33c' or 33d', respectively, and one of the fifth, the sixth, the seventh and the eighth movable driven comb portions 33e, 33f, 33g, 33h of the second and third supporting arms 34b, 34c, in a spaced-apart relation therewith.

Accordingly, with the application of electric power, an electrostatic force is generated between the first, second, third and fourth movable driven comb portions 33a', 33b', 33c', 33d', respectively, and the first, second, third and fourth fixed driving comb portions 35a', 35b', 35c', 35d', respectively, by the first and the second DC power source 51a, 51b. The first and second AC power source 52a, 52b elastically deform a first, second, third and fourth driving springs 34a', 34b', 34c', 34d', respectively, of the driving supporter 34, so that the driven element 33 performs the oscillating motion 63 by rotating in a regular angle with respect to the Z-axis, as shown in FIGS. 5 and 6A.

To control the motion of the driven element 33, the intermediate structure 3 further includes a drive sensing part 36.

The drive sensing part 36 includes the first drive sensing electrode pad 36a and the second drive sensing electrode pad 36b arranged in intervals of a predetermined angle from each other, dividing the circumference of the circular rim frame 33' among the two between the first, second, third and fourth driving electrode pads 35a, 35b, 35c, 35d, which are arranged in the intervals of the predetermined angle from one another to divide the circumference of the circular rim frame 33' among the four. The drive sensing part 36 additionally includes a first and a fourth movable drive sensing comb portion 34a''' and 34d''', respectively, and a second and a third movable drive sensing comb portions 36c', 36d', respectively, formed respectively on one side surface of the first and the fourth supporting arms 34a, 34d, and at one side surface of the first and the second sensing arms 36c, 36d around the circular rim frame 33' in a vicinity of the first and the fourth supporting arms 34a, 34d. The drive sensing part 36 further includes a first and a second fixed drive sensing comb portions 36aa, 36ab and a third and a fourth fixed drive sensing comb portions 36ba, 36bb formed respectively at the first and the second drive sensing electrode pads 36a, 36b to be arranged opposite to the first and the second movable drive sensing comb portions 34a''', 36c' and the third and the fourth movable drive sensing comb portions 36d', 34d''' in a spaced-apart relation therewith.

As shown in FIG. 5, the first and the second drive sensing electrode pads 36a, 36b are connected to the drive control circuit 70.

The drive control circuit 70 senses a change in a capacitance generated between the first and the second movable drive sensing comb portions 34a''', 36c' and the first and the second fixed drive sensing comb portions 36aa, 36ab, and between the third and the fourth movable drive sensing comb portions 36d', 34d''' and the third and the fourth fixed drive sensing comb portions 36ba, 36bb. In addition, the drive control circuit 70 regulates a voltage applied to the first, the second, the third, and the fourth driving electrode pads 35a, 35b, 35c, 35d to control the oscillating motion of the driven element 33.

Referring again to FIGS. 2A and 2B, the intermediate structure 3 further includes a periphery supporting member 38 combined with the cover 4 and enclosing the driven element 33, the driving electrode 35, and the driving supporter 34. The periphery supporting member 38 has a rectangular-shaped configuration.

As described above, the driving supporter 34 is provided with the first, second, third and fourth supporting arms 34a, 34b, 34c, 34d, respectively, extending radially from around the circular rim frame 33'. In addition, the driving supporter 34 is provided with a first and a fourth driving springs 34a', 34d' and a second and a third driving springs 34b', 34c' connecting respectively the first and the fourth supporting arms 34a, 34d and the second and the third supporting arms 34b, 34c to a first and a second fixing supporting ends 34a'', 34d'' supported on the insulator 2 and a third and a fourth fixed supporting ends 34b'', 34c'' connected to the periphery supporting member 38, to allow the circular rim frame 33' of the driven element 33 to oscillate with respect to the Z-axis.

Between the periphery supporting member 38 and the second and third driving springs 34b', 34c' around the circular rim frame 33' of the intermediate structure 3 are disposed the first and the second fixed sensing electrode pads 37a, 37b of the fixed sensing electrode pad part 37 which are connected with a first and a second electrode wire (42a, 42b of FIG. 4) to be described below when the cover 4 is combined with the periphery supporting member 38.

As shown in FIG. 5, the first and the second fixed sensing electrode pads 37a, 37b, which are supplied with a DC voltage by a sensing DC power source 53, are connected to a sensing circuit 80 that detects a capacitance of a first and a second fixed sensing electrode parts (41a, 41b of FIG. 4) varying according to the sensing motion (62 of FIG. 6B) of the sensing element 31 to be described in detail below, as a voltage signal to sense an angular velocity.

Referring again to FIGS. 2A and 2B, the sensing element 31 is composed of the circular disk 31a having a circular hole 31b formed at a center thereof.

As shown in FIG. 1B, disposed in the circular hole 31b in a spaced-apart relation therewith is a fixing portion 39 interconnecting between a first support 22 of the insulator 2 and a second support 44 of the cover 4 in order to fix and support the cover 4.

As may be seen in FIG. 2A, the sensing connector 32 is composed of a first and a second sensing springs 32a, 32b connecting both ends of the circular disk 31a with the circular rim frame 33' of the driven element 33.

Figure 3:
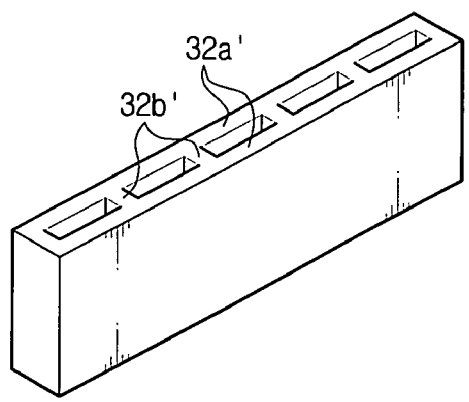
FIG. 3 illustrates a perspective view of a sensing spring of a sensing connector of the intermediate structure shown in FIGS. 2A and 2B.

Each of the first and second sensing springs 32a, 32b can be formed of a beam having a predetermined length and a rectangular cross section, or a beam structure in which, as shown in FIG. 3, two beams 32a', each having a predetermined length and a rectangular cross section, are connected by a plurality of connecting members 32b'.

Accordingly, while the driven element 33 is performing the oscillating motion (63 of FIGS. 6A and 6B) of rotating in the predetermined angle with respect to the Z-axis, when an input angular velocity (61 of FIG. 5) is applied to the sensing element 31 from any one axis, for example, the X-axis parallel to the center plane of the intermediate structure 3, the sensing element 31 performs the sensing motion 62 of rotating with respect to the Y-axis normal to the Z-axis and the X-axis due to the Coriolis force, as shown in FIG. 6B.

The sensing motion 62 of the sensing element 31 induces a change in capacitance of the first and second fixed sensing electrode parts 41a, 41b of a sensing electrode 41, which will be described below. That change in capacitance is detected as a voltage signal by the sensing circuit 80 to calculate an angular velocity.

Figure 4:
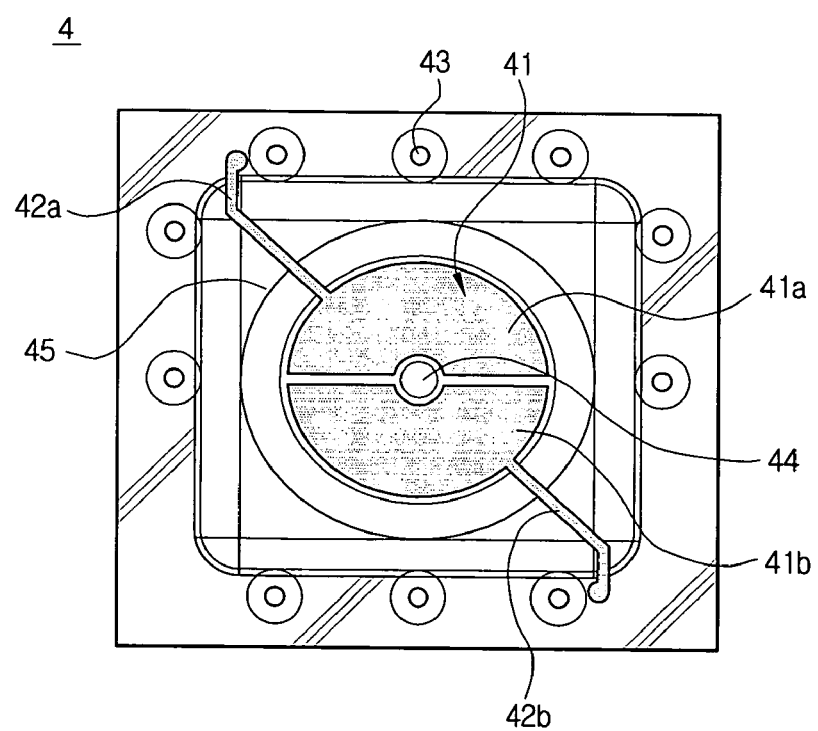
FIG. 4 illustrates a top plan view of an inside of a cover of the rotary gyroscope shown in FIGS. 1A and 1B.

FIG. 4 illustrates an inside of the cover 4.

As shown in FIG. 4, the sensing electrode 41, which is disposed in the cover 4, is composed of a first and a second fixed sensing electrode parts 41a, 41b formed respectively in a semi-circular shape at a portion of the cover 4 corresponding to the circular disk 31a of the sensing element 31 to be divided among the two with respect to the first and the second sensing springs 32a, 32b.

The sensing element 31 is coupled to allow a motion thereof to be affected by a motion of the driven element 33, so that when the sensing electrode 41 is formed in a circular shape, such an affection due to the motion of the driven element 33 several hundred through several thousand times as large as that of the sensing element 31 can be removed.

Figure 7A:
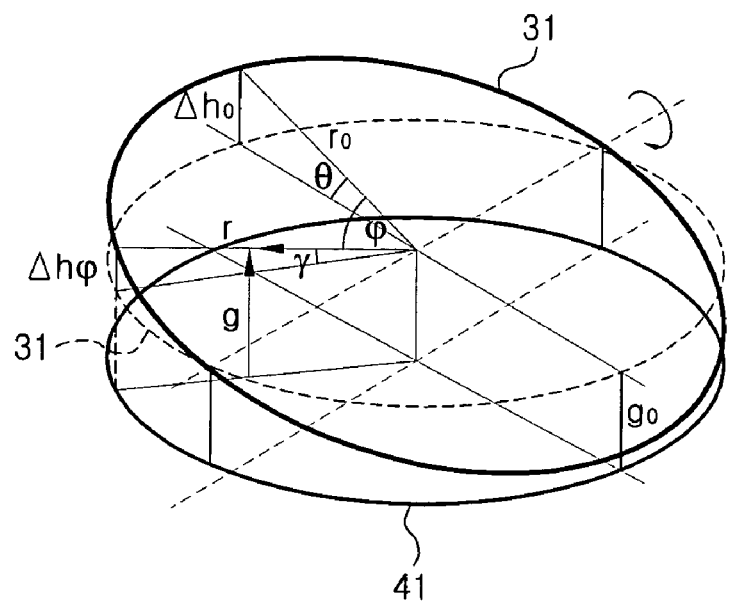
FIGS. 7A and 7B illustrate conceptional views for structure analysis of a sensing electrode of the cover of the rotary gyroscope shown in FIGS. 1A and 1B.
Figure 7B:
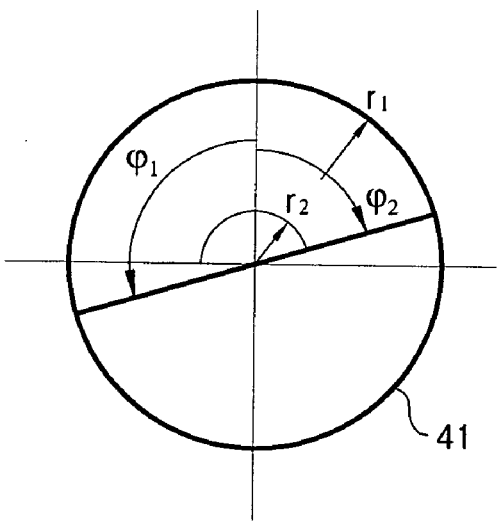

For verification analysis, a capacitance C of the sensing electrode 41 caused by a motion of the sensing element 31 was calculated based on the following mathematical formula 1, based on an assumption that the sensing element 31 and the sensing electrode 41 were formed in a circular shape, as shown in FIGS. 7A and 7B. As a result, when an outer radius $r_1$ and an inner radius $r_2$ of the sensing electrode 41 were 0 μm and 500 μm, respectively, a rotation angle φ of the driven element 33 was 0.5°, and a rotation angle θ of the sensing element 31 was 0.5°, the capacitance C was calculated as changed by as much as 0.003% as compared with that when there was no motion of the sensing element 31.

$$C = \varepsilon \int_{\phi_1}^{\phi_2} \frac{1}{\sin\theta\cos\phi} \left\{ (r1 - r2) - \frac{g0}{\sin\theta\cos\phi} \ln\left[\frac{g0 + r2\sin\theta\cos\phi}{g0 + r1\sin\theta\cos\phi}\right] \right\} d\phi \quad (1)$$

Where ε is a dielectric constant, $\phi_1$ and $\phi_2$ are maximum and minimum angles of effective sensing electrode 41 in which the sensing motion is considered, θ is a rotation angle of the sensing element 31 caused by the Coriolis force, $r_1$ and $r_2$ are an outer radius and an inner radius of the sensing electrode 41 and $g_0$ is an initial gap between the sensing element 31 and the sensing electrode 41.

Accordingly, it may be appreciated that the shape of the sensing electrode 41 of the present invention is almost not affected by the oscillating motion of the driven element 33.

In FIG. 7A, $r_0$ and r, and $\Delta h_0$ and $\Delta h_\phi$ indicate radiuses and rotation heights of the sensing element 31, respectively, when the sensing element 31 rotates as much as angle θ from an initial position due to the Coriolis force and when the sensing element 31 rotates as much as angle y due to the Coriolis force from the position rotated in the degree φ by the driven element 33, and g designates a gap between the sensing element 31 and the sensing electrode 41 when the sensing element 31 rotates as much as angle y due to the Coriolis force from the position rotated in the degree φ by the driven element 33.

In addition, since the sensing electrode 41 is formed in the cover 4 to have a predetermined gap $g_0$ apart from the circular disk 31a, a problem that the sensing element 31 and the sensing electrode 41 have to be fabricated spaced apart from each other and a problem that the sensing element 31 and the sensing electrode 41 adhere to each other may be prevented.

As may be seen in FIG. 4, the first and the second fixed sensing electrode parts 41a, 41b are provided with a first and a second electrode wires 42a, 42b, respectively. Each of the first and the second fixed sensing electrode parts 41a, 41b has a predetermined width and is disposed along an inner surface 45 of the cover 4 to be connected with the first or the second fixed sensing electrode pad 37a or 37b of the fixed sensing electrode pad part 37 disposed at the intermediate structure 3 around the circular rim frame 33' when the cover 4 is combined with the intermediate structure 3.

Further, the cover 4 is penetrated by a plurality of holes 43 formed at portions of the cover 4 positioned correspondingly to the first, second, third and fourth driving electrode pads 35a, 35b, 35c, 35d, respectively, the first and second drive sensing electrode pads 36a, 36b, respectively, and the first and second fixed sensing electrode pads 37a, 37b, respectively, to allow wires to be connected thereto from the outside.

Additionally, to reduce a weight of the driven element 33 and the sensing element 31 thereby to facilitate a motion thereof, the circular rim frame 33', and the driving arms 33aa, 33ab, 33ac; 33ba, 33bb, 33bc; 33ca, 33cb, 33cc; 33da, 33db, 33dc of the driven element 33; the first, the second, the third and the fourth supporting arms 34a, 34b, 34c, 34d of the driving supporter 34, the first and the second sensing arms 36c, 36d; and the circular disk 31a of the sensing element 31 are each provided with a plurality of etching holes 65 formed in a predetermined pattern, for example, in a radial pattern.

In addition to reducing the weight of the driven element 33 and the sensing element 31 to facilitate the motion thereof during driving of the gyroscope 10, the etching holes 65 function to assist etching and removing a region of the insulator 2 and a periphery region exposed by the etching holes 65, that is, a portion of the insulator 2 over where the movable component parts of the intermediate structure 3 including the circular rim frame 33', the driving arms 33aa, 33ab, 33ac; 33ba, 33bb, 33bc; 33ca, 33cb, 33cc; 33da, 33db, 33dc, the first, the second, the third and the fourth supporting arms 34a, 34b, 34c, 34d, the first and the second sensing arms 36c, 36d, and the circular disk 31a are positioned, through an etching gas when the inner receiving opening 21 of the insulator 2 is formed in fabrication of the gyroscope 10.

Accordingly, the other portion of the insulator 2, over where the fixed component parts of the intermediate structure 3 without having the etching holes 65, including the periphery supporting member 38, the first, second, third and fourth driving electrode pads 35a, 35b, 35c, 35d, the first and second drive sensing electrode pads 36a, 36b, the first and second fixed sensing electrode pads 37a, 37b, and the first, second, third and fourth fixed supporting ends 34a'', 34b'', 34c'', 34d, are positioned, is not etched, and thus remains.

Here, it should be noted that in the above description, the gyroscope 10 of the present invention is illustrated and explained as the base plate 1, the insulator 2, the intermediate structure 3 and the cover 4 being separately formed, but in practical fabrication, they may be fabricated by a method of forming the base plate 1, the insulator 2, and the intermediate structure 3 with a silicon-on-insulator (SOI) wafer in which one silicon wafer having an insulator formed at one surface thereof is adhered with another wafer, forming the cover 4 with a glass wafer, and then adhering the two wafers to each other, or by a method of forming the base plate 1 and the cover 4 respectively with glass wafers, forming the intermediate structure 3 with a silicon wafer, and then adhering the three wafers to one another.

At this point, in the latter method, the base plate 1 and the insulator 2 are formed with one glass wafer. For example, the insulator 2 is not formed, but only the inner receiving opening is formed in the glass wafer of the base plate 1 to assure the movable component parts of the intermediate structure 3 to float therein and/or thereover.

An operation of the rotary gyroscope 10 constructed as above according to an embodiment of the present invention will now be described with reference to FIGS. 1 through 6B.

First, when electric power is applied to the first, second, third and fourth driving electrode pads 35a, 35b, 35c, 35d, respectively, by the first and the second DC power source 51a, 51b and the first and second AC power source 52a, 52b, as shown in FIGS. 5 and 6A, the first, second, third and fourth driving springs 34a', 34b', 34c', 34d' of the driving supporter 34 are elastically deformed by an electrostatic force generating between the first, second, third and fourth movable driven comb portions 33a', 33b', 33c', 33d' and the first, second, third and fourth fixed driving comb portions 35a', 35b', 35c', 35d', so that the driven element 33 performs the oscillating motion 63 of rotating in a predetermined angle, e.g., 0.5° with respect to the Z-axis, together with the sensing element 31.

At this time, the drive control circuit 70 connected to the first and second drive sensing electrode pads 36a, 36b senses a change in capacitance generating between the first and second movable drive sensing comb portions 34a''', 36c' and the first and second fixed drive sensing comb portions 36aa, 36ab, and between the third and fourth movable drive sensing comb portions 36d', 34d''' and the third and fourth fixed drive sensing comb portions 36ba, 36bb, and regulates a voltage applied to the first, second, third, and fourth driving electrode pads 35a, 35b, 35c, 35d, respectively, to control the oscillating motion 63 of the driven element 33.

Thus, while the driven element 33 is performing the oscillating motion 63 of rotating in the predetermined angle with respect to the Z-axis, as shown in FIGS. 5 and 6A, when an input angular velocity 61 is applied to the intermediate structure 3 from any one axis, e.g., the X-axis parallel to the center plane of the intermediate structure 3, the sensing element 31 and the driven element 33 of the intermediate structure 3 are subjected to a Coriolis force of rotating with respect to the Y-axis normal to the Z-axis and the X-axis.

At this time, the driven element 33, which is supported on and by the four driving springs 34a', 34b', 34c', 34d' of the driving supporter 34, is secured so as not to rotate with respect to the Y-axis. However, the sensing element 31, which is supported on and by the first and the second sensing springs 32a, 32b arranged on the Y-axis, performs the sensing motion 62 of twist-rotating in a predetermined angle, for example, 0.001° with respect to the Y-axis.

The sensing motion 62 of the sensing element 31 induces a change in capacitance of the first and second fixed sensing electrode parts 41a, 41b of the sensing electrode 41. This change in capacitance is detected as a voltage signal by the sensing circuit 80 connected to the first and second fixed sensing electrode parts 41a, 41b through the first and the second fixed sensing electrode pads 37a, 37b of the fixed sensing electrode pad part 37 to calculate an angular velocity.

As is apparent from the foregoing description, it may be appreciated that the rotary gyroscope of the present invention is constructed such that the motion of the driven element is decoupled and the motion of the sensing element is coupled, to allow the Coriolis force to additionally act on the sensing element thereby enhancing sensing performance, and also that the driven element is disposed around the sensing element to provide a structure stable to deformation of sensing mode.

Further, in the rotary gyroscope of the present invention, the sensing electrode is preferably formed in a circular shape, so that the couple problem that the motion of the driven element affects the motion of the sensing element can be solved.

In addition, in the rotary gyroscope of the present invention, the sensing electrode is preferably formed in the cover, so that the problem that the sensing element and the sensing electrode have to be fabricated spaced apart from each other and the problem that the sensing element and the sensing electrode adhere to each other may be prevented.

A preferred embodiment of the present invention has been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rotary gyroscope, comprising:
    a base plate;
    an intermediate structure, including:
        a driven element supported in a spaced-apart relation from the base plate and floating over the base plate and supported by a driving supporter radially extending therefrom, the driven element performing an oscillating motion with respect to a first axis, which is normal to a center plane thereof;
        a driving electrode driving the driven element to perform the oscillating motion with respect to the first axis;
        a sensing element disposed in the driven element and connected to the driven element by a sensing connector to oscillate together with the driven element and concurrently to perform a sensing motion with respect to a third axis, which is normal to the first axis and any second axis, which is parallel to a center plane, due to a Coriolis force when an angular velocity is inputted from the second axis; and
        a drive sensing part controlling the oscillating motion of the driven element including:
            a drive sensing electrode pad part arranged around the driven element;
            a plurality of movable drive sensing comb portions formed on supporting arms of the driving supporter and at least one sensing arm arranged with respect to the drive sensing electrode pad part around the driven element; and
            a plurality of fixed drive sensing comb portions formed on the drive sensing electrode pad part to be arranged opposite to respective movable drive sensing comb portions in a spaced-apart relation therewith; and
    a cover covering the intermediate structure and having a sensing electrode arranged in a position corresponding to the sensing element in a spaced-apart relation therewith to detect the sensing motion of the sensing element.

2. The rotary gyroscope as claimed in claim 1, wherein the driven element comprises:
    a circular rim frame disposed in a spaced-apart relation with the base plate to float over the base plate; and a plurality of driven arm parts extending radially from around the circular rim frame.

3. The rotary gyroscope as claimed in claim 2, wherein each of the plurality of driven arm parts comprises:
a plurality of driven arms; and
a plurality of movable driven comb portions, each having a plurality of movable driven combs formed alternately in two different directions at a circumference in a unit of the driven arm part at one of either side surface of the driven arms of the corresponding driven arm part.

4. The rotary gyroscope as claimed in claim 3, wherein the driving electrode comprises:
a driving electrode pad part disposed around the driven element; and
a plurality of fixed driving comb portions formed in a circumferential direction at the driving electrode pad part to be arranged opposite to the corresponding movable driven comb portions in a spaced-apart relation therewith.

5. The rotary gyroscope as claimed in claim 4, wherein the driving electrode pad part comprises:
four driving electrode pads arranged in intervals of a predetermined angle from one another to divide a circumference of the driven element, and
wherein the plurality of fixed driving comb portions includes:
four fixed driving comb portions, each having a plurality of fixed driving combs formed alternately in two different directions at a circumference in a unit of driving electrode pad at the respective driving electrode pads to be arranged opposite to the movable driven combs of the corresponding movable driven comb portion in a spaced-apart relation therewith.

6. The rotary gyroscope as claimed in claim 2, wherein the driven element, the driven arm part, the driving supporter, and the sensing element each include a plurality of holes formed in a predetermined pattern to reduce weight thereof, thereby facilitating the motion thereof and an etching of an insulator.

7. The rotary gyroscope as claimed in claim 1, wherein the drive sensing electrode pad part comprises:
two drive sensing electrode pads arranged in intervals of a predetermined angle from each other to divide a circumference of the driven element, and
wherein the plurality of fixed drive sensing comb portions includes two fixed driving comb portions, each having a plurality of fixed driving combs formed in a same direction at a circumference on the corresponding drive sensing electrode pad.

8. The rotary gyroscope as claimed in claim 1, wherein the intermediate structure further comprises a periphery supporting member combined with the cover and enclosing the driven element, the driving electrode, and the driving supporter.

9. The rotary gyroscope as claimed in claim 8, wherein the periphery supporting member, the base plate, the intermediate structure, and the cover each have a rectangular-shaped configuration.

10. The rotary gyroscope as claimed in claim 8, wherein the driving supporter comprises:
a plurality of supporting arms extended radially from around the driven element; and
a plurality of driving springs interconnecting between the plurality of supporting arms and one of the periphery supporting member and fixed supporting ends supported at the base plate to allow the driven element to perform the oscillating motion with respect to the first axis.

11. The rotary gyroscope as claimed in claim 10, wherein the driving supporter comprises four driving supporters disposed in a vicinity of a diagonal corner of the periphery supporting member.

12. The rotary gyroscope as claimed in claim 8, further comprising an insulator disposed between the base plate and the intermediate structure, to float the sensing element and the driven element over the base plate in a spaced-apart relation therewith and at the same time to support and insulate fixed supporting ends for supporting at least the driving electrode, the periphery supporting member and the driving supporter on and from the base plate.

13. The rotary gyroscope as claimed in claim 12, wherein the base plate, the insulator, and the intermediate structure are each formed of a SOI wafer, and the cover is formed of a glass wafer.

14. The rotary gyroscope as claimed in claim 12, wherein the base plate and the insulator are formed of a glass wafer, the intermediate structure is formed of a silicon wafer, and the cover is a glass wafer.

15. The rotary gyroscope as claimed in claim 1, wherein the sensing element comprises a circular disk having a circular hole formed at a center thereof.

16. The rotary gyroscope as claimed in claim 15, wherein the intermediate structure further comprises a fixing portion disposed in the circular hole in a spaced-apart relation therewith to interconnect the base plate and the cover.

17. The rotary gyroscope of claim 1, wherein the sensing connector comprises two sensing springs connecting the sensing element and the driven element.

18. The rotary gyroscope as claimed in claim 17, wherein each of the sensing springs comprises one configuration selected from the group consisting of a beam having a predetermined length and a rectangular cross section, and a beam structure in which more than two beams, each having a predetermined length and a rectangular cross section, are connected by at least one connecting member.

19. The rotary gyroscope as claimed in claim 18, wherein the sensing electrode comprises two fixed sensing electrode parts formed respectively in a semi-circular shape at a portion of the cover opposite to the sensing element to be divided among the two with respect to an axis on which the sensing springs are disposed.

20. The rotary gyroscope as claimed in claim 19, wherein each of the fixed sensing electrode parts comprises an electrode wire having a predetermined width, disposed along an inner surface of the cover to be connected with a corresponding fixed sensing electrode pad disposed at the intermediate structure.

21. The rotary gyroscope as claimed in claim 1, wherein the cover comprises a plurality of holes penetrating the cover formed at positions of the cover corresponding to driving electrode pads, drive sensing electrode pads, and fixed sensing electrode pads to allow wires to be connected thereto from outside, the driving electrode pads constituting the driving electrode, the drive sensing electrode pads being disposed at the intermediate structure to constitute the drive sensing part, and the fixed sensing electrode pads being disposed at the intermediate structure to be connected with the sensing electrode.

22. A rotary gyroscope, comprising:
a base plate;
an intermediate structure, including:

a driven element supported in a spaced-apart relation from the base plate and floating over the base plate as supported by a driving supporter radially extending therefrom, the driven element performing an oscillating motion with respect to a first axis, which is normal to a center plane thereof;

a driving electrode driving the driven element to perform the oscillating motion with respect to the first axis;

a sensing element disposed in the driven element and connected to the driven element by a sensing connector to oscillate together with the driven element and concurrently to perform a sensing motion with respect to a third axis, which is vertical to the first axis and any second axis, which is parallel to a center plane, due to a Coriolis force when an angular velocity is inputted from the second axis, wherein the sensing element includes a circular disk having a circular hole formed at a center thereof; and a cover covering the intermediate structure and having a sensing electrode arranged in a position corresponding to the sensing element in a spaced-apart relation therewith to detect the sensing motion of the sensing element, wherein the intermediate structure further includes a fixing portion disposed in the circular hole in a spaced-apart relation therewith to interconnect the base plate and the cover.

* * * * *